(12) United States Patent
Yamauchi et al.

(10) Patent No.: US 12,702,083 B2
(45) Date of Patent: Aug. 11, 2026

(54) INFORMATION OUTPUT DEVICE AND INFORMATION OUTPUT METHOD

(71) Applicant: HONDA MOTOR CO., LTD., Tokyo (JP)

(72) Inventors: Ken Yamauchi, Wako (JP); Hideaki Shimamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 772 days.

(21) Appl. No.: 17/955,588

(22) Filed: Sep. 29, 2022

(65) Prior Publication Data

US 2024/0107936 A1 Apr. 4, 2024

(51) Int. Cl.
*A01D 34/00* (2006.01)
*A01D 101/00* (2006.01)
*G05D 1/00* (2024.01)

(52) U.S. Cl.
CPC ......... *A01D 34/008* (2013.01); *G05D 1/0088* (2013.01); *A01D 2101/00* (2013.01)

(58) Field of Classification Search
CPC ....... G06Q 30/0631; G06Q 30/0207–30/0277; G06Q 10/0639; G06Q 30/0645; A01D 34/008; A01D 2101/00; G05D 1/0088
See application file for complete search history.

(56) References Cited

U.S. PATENT DOCUMENTS 10,762,537 B2 9/2020 Albinger et al.
2008/0312773 A1* 12/2008 Nag .................... A47L 15/4293 700/275
2015/0168147 A1* 6/2015 Duleba .............. G01C 21/3484 701/538
2016/0108095 A1* 4/2016 Mario ................ G06Q 30/0631
2019/0266554 A1* 8/2019 Lin ...................... G06Q 10/087
(Continued)

FOREIGN PATENT DOCUMENTS

WO WO-2016108095 A1 * 7/2016 ......... G06Q 30/0631

OTHER PUBLICATIONS

A modular and scalable simulation framework for agricultural vehicles (Year: 2016).*
(Continued)

*Primary Examiner* — Gautam Ubale
(74) *Attorney, Agent, or Firm* — Amin, Turocy & Watson, LLP

(57) ABSTRACT

An information output device includes a first acquisition unit that acquires request information that is a request of a user, a second acquisition unit that acquires working machine information related to performance of an autonomous working machine and set for each type of the autonomous working machine, and an output unit that outputs recommendation information satisfying the request of the user, based on the request information and each piece of the working machine information. The request information includes information about a working time during which the autonomous working machine works, information about a work region in which the autonomous working machine works, and information about a cost for using the autonomous working machine, and the recommendation information includes information about a model of the autonomous working machine to be recommended to the user for acquisition.

7 Claims, 4 Drawing Sheets

(56) References Cited

U.S. PATENT DOCUMENTS

| | | | | |
|---|---|---|---|---|
| 2019/0357431 | A1* | 11/2019 | Kamfors | G05D 1/0214 |
| 2020/0065879 | A1* | 2/2020 | Hu | G06Q 30/0631 |
| 2021/0042812 | A1* | 2/2021 | Locks | G06Q 30/0613 |
| 2021/0076563 | A1* | 3/2021 | Andriolo | G05D 1/0088 |
| 2021/0400863 | A1* | 12/2021 | Matsuhisa | A01B 69/001 |
| 2022/0201923 | A1* | 6/2022 | Adachi | G05D 1/0248 |
| 2024/0373782 | A1* | 11/2024 | Roos | A01D 34/008 |

OTHER PUBLICATIONS

Design and Re-engineering of an Automated Solar Lawn Mower (Year: 2021).*

* cited by examiner

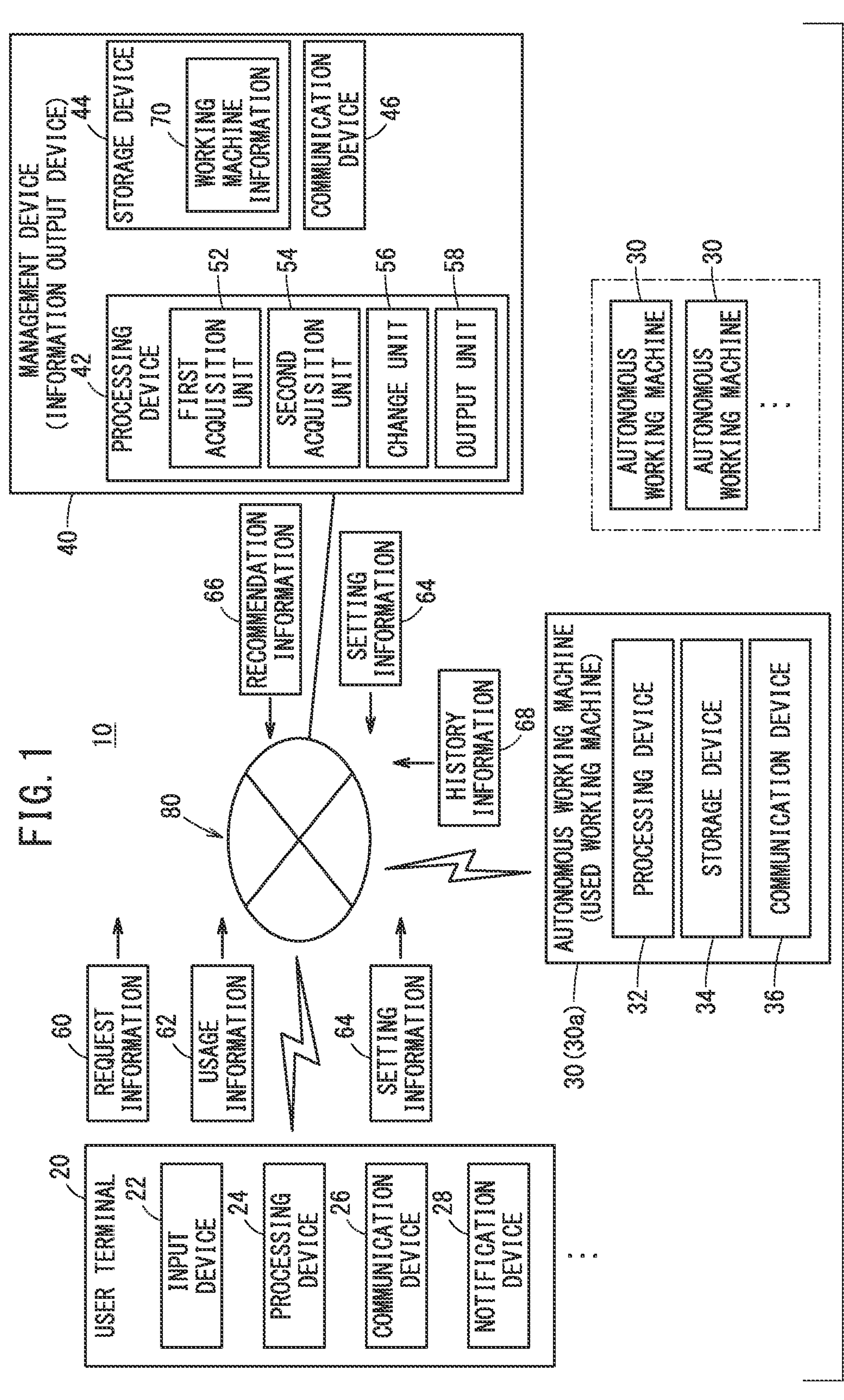

FIG. 1
10
MANAGEMENT DEVICE (INFORMATION OUTPUT DEVICE)
40
42
PROCESSING DEVICE
52
FIRST ACQUISITION UNIT
54
SECOND ACQUISITION UNIT
56
CHANGE UNIT
58
OUTPUT UNIT
44
STORAGE DEVICE
70
WORKING MACHINE INFORMATION
COMMUNICATION DEVICE
46
66
RECOMMENDATION INFORMATION
SETTING INFORMATION
64
HISTORY INFORMATION
68
80
AUTONOMOUS WORKING MACHINE
30
AUTONOMOUS WORKING MACHINE
30
20
USER TERMINAL
22
INPUT DEVICE
24
PROCESSING DEVICE
26
COMMUNICATION DEVICE
28
NOTIFICATION DEVICE
60
REQUEST INFORMATION
62
USAGE INFORMATION
64
SETTING INFORMATION
AUTONOMOUS WORKING MACHINE (USED WORKING MACHINE)
30 (30a)
PROCESSING DEVICE
32
STORAGE DEVICE
34
COMMUNICATION DEVICE
36

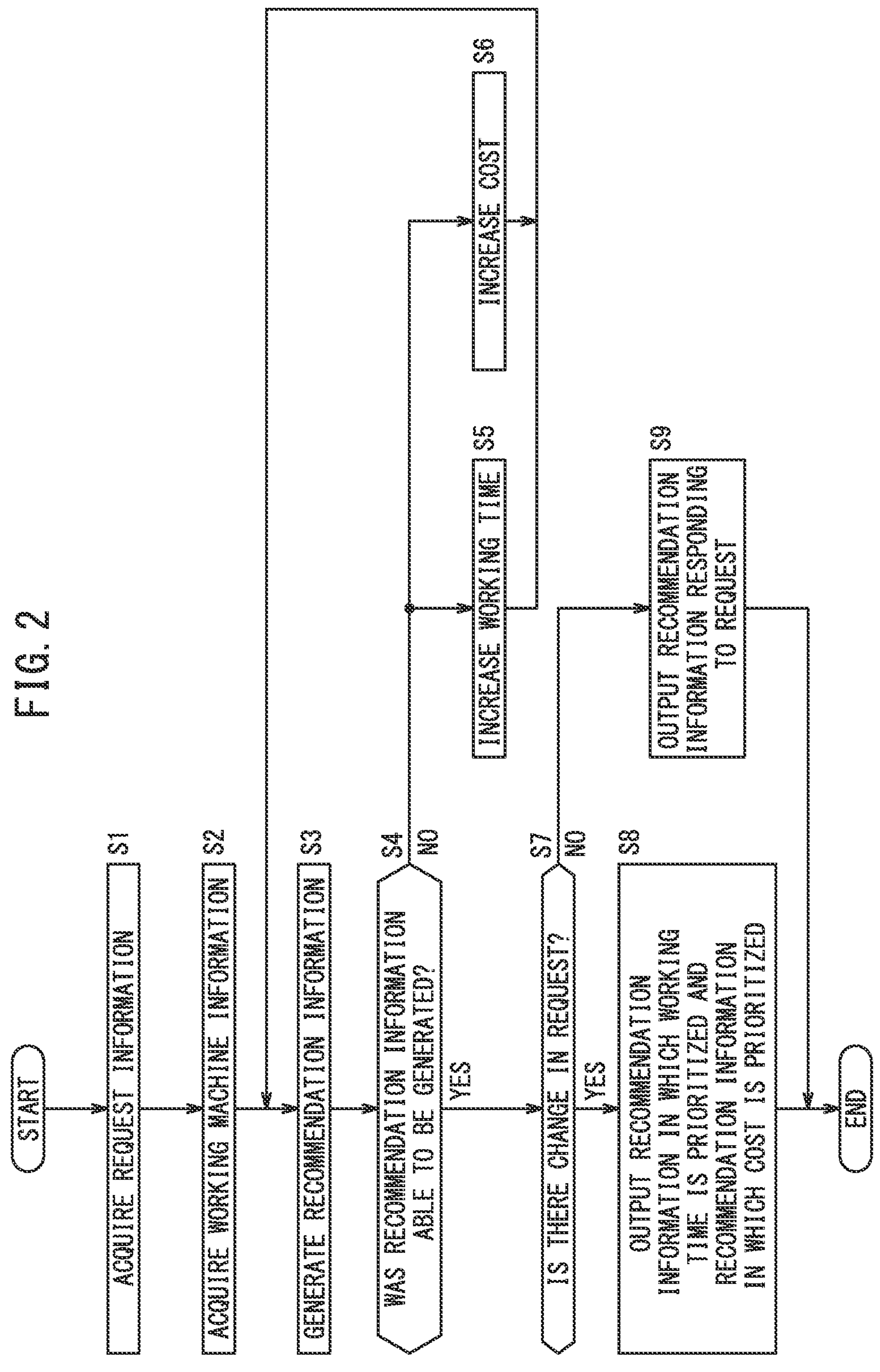
FIG. 2
START
ACQUIRE REQUEST INFORMATION
S1
ACQUIRE WORKING MACHINE INFORMATION
S2
GENERATE RECOMMENDATION INFORMATION
S3
WAS RECOMMENDATION INFORMATION ABLE TO BE GENERATED?
S4
NO
YES
INCREASE WORKING TIME
S5
INCREASE COST
S6
IS THERE CHANGE IN REQUEST?
S7
NO
YES
OUTPUT RECOMMENDATION INFORMATION IN WHICH WORKING TIME IS PRIORITIZED AND RECOMMENDATION INFORMATION IN WHICH COST IS PRIORITIZED
S8
OUTPUT RECOMMENDATION INFORMATION RESPONDING TO REQUEST
S9
END START
ACQUIRE REQUEST INFORMATION AND USAGE INFORMATION
S11
ACQUIRE HISTORY INFORMATION
S12
ACQUIRE WORKING MACHINE INFORMATION
S13
GENERATE RECOMMENDATION INFORMATION
S14
WAS RECOMMENDATION INFORMATION ABLE TO BE GENERATED?
S15
NO
YES
A
INCREASE WORKING TIME
S16
INCREASE COST
S17

INFORMATION OUTPUT DEVICE AND INFORMATION OUTPUT METHOD

BACKGROUND OF THE INVENTION

Field of the Invention

The present invention relates to an information output device and an information output method for outputting recommendation information about an autonomous working machine.

Description of the Related Art

A user who newly starts work by using a working machine needs to acquire (purchase or rent) the working machine. U.S. Pat. No. 10,762,537 B2 discloses a technique for presenting, to a user mowing in a garden, a riding lawn mower (riding working machine) corresponding to the garden.

SUMMARY OF THE INVENTION

In recent years, autonomous working machines capable of autonomously traveling and autonomously working have been developed. The performance of the autonomous working machine varies depending on the model of the autonomous working machine. Therefore, when two types of autonomous working machines work under the same conditions, the time required to complete the work or the work result is different. For this reason, when the input condition is only the condition of the work region (the condition of the garden) as in the technique of U.S. Pat. No. 10,762,537 B2, there is a possibility that the presented autonomous working machine does not satisfy the request of the user.

An object of the present invention is to solve the above-mentioned problem.

According to a first aspect of the present invention, there is provided an information output device that outputs recommendation information related to an autonomous working machine configured to autonomously travel and autonomously work, the information output device comprising: a first acquisition unit configured to acquire request information that is a request of a user; a second acquisition unit configured to acquire working machine information that is related to performance of the autonomous working machine and is set for each type of the autonomous working machine; an output unit configured to output the recommendation information satisfying the request of the user, based on the request information and each piece of the working machine information, wherein the request information includes information about a working time during which the autonomous working machine works, information about a work region in which the autonomous working machine works, and information about a cost for using the autonomous working machine, and the recommendation information includes information about a model of the autonomous working machine to be recommended to the user for acquisition.

According to a second aspect of the present invention, there is provided an information output method for outputting recommendation information related to an autonomous working machine, wherein a computer executes: acquiring request information that is a request of a user; acquiring working machine information that is related to performance of the autonomous working machine and is set for each type of the autonomous working machine; outputting the recommendation information satisfying the request of the user, based on the request information and each piece of the working machine information, and wherein the request information includes information about a working time during which the autonomous working machine works, information about a work region in which the autonomous working machine works, and information about a cost for introducing the autonomous working machine, and the recommendation information includes information about a model of the autonomous working machine to be recommended to the user for acquisition.

According to the present invention, it is possible to recommend a model of an autonomous working machine suitable for a working time of a user and cost.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 1 is a configuration diagram of a working machine management system;

FIG. 2 is a flowchart of an information outputting process according to a first embodiment;

DETAILED DESCRIPTION OF THE INVENTION

Figure 3:
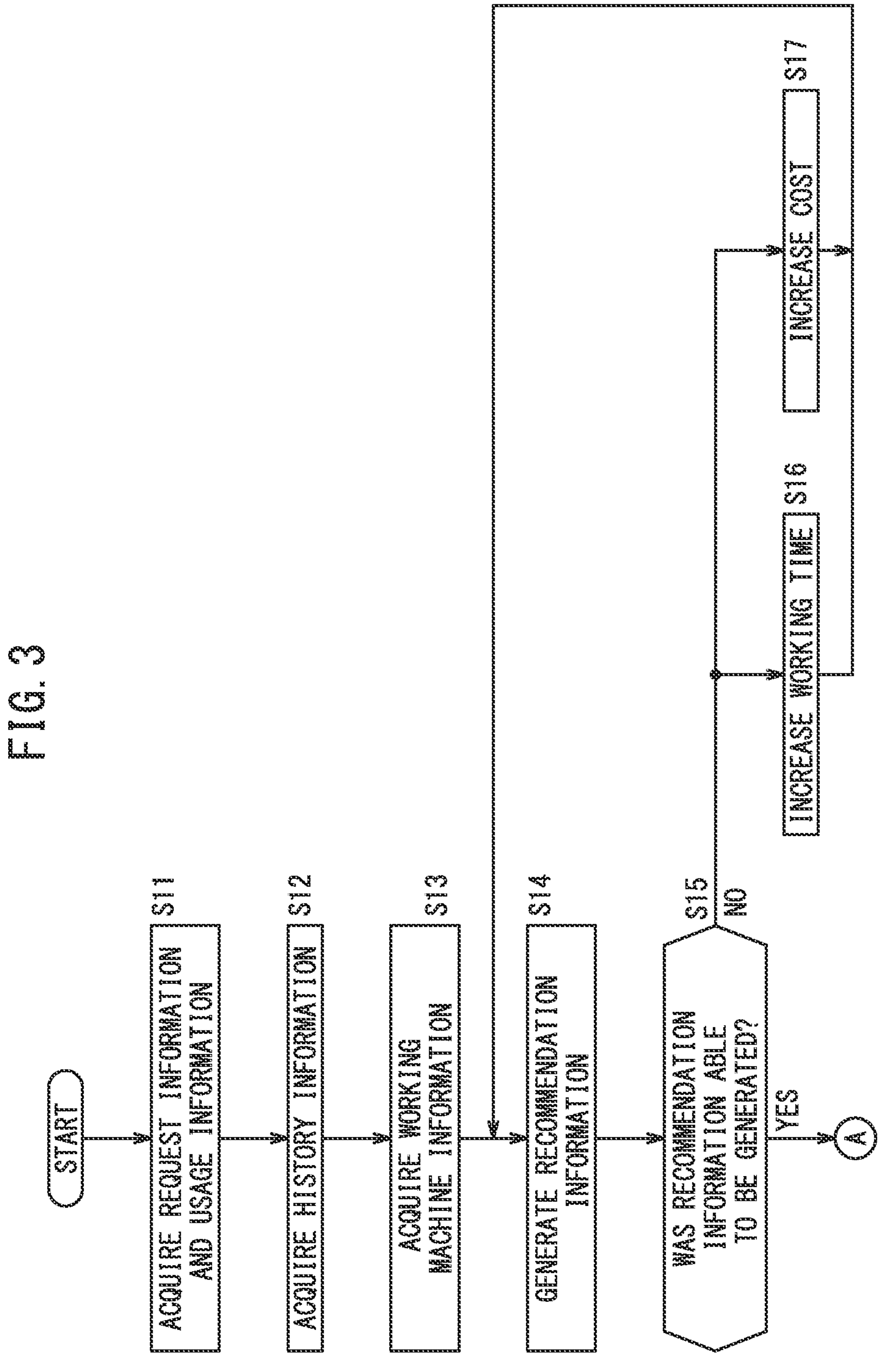
FIG. 3 is a flowchart of an information outputting process according to a second embodiment.

1. Configuration of Working Machine Management System 10

FIG. 1 is a configuration diagram of a working machine management system 10. The working machine management system 10 includes one or more user terminals 20, one or more autonomous working machines 30, and a management device (information output device) 40. The user terminal 20 and the management device 40 can communicate with each other via a communication network 80. Further, the autonomous working machine 30 and the management device 40 can communicate with each other via the communication network 80. The communication network 80 is, for example, the Internet.

The user terminal 20 is a terminal device that is operable by a user. The user terminal 20 is, for example, a smartphone, a tablet terminal, a personal computer, or the like. The user terminal 20 includes an input device 22, a processing device 24, a memory (not shown), a communication device 26, and a notification device 28. The input device 22 includes a touch sensor, a keyboard, a mouse, a voice input device, and the like. The processing device 24 includes processing circuitry. The processing circuitry may be a processor such as a CPU or a GPU. The communication device 26 includes a communication module capable of communicating with the management device 40 via the communication network 80. The notification device 28 includes a display device including a display, an acoustic device including a speaker, and the like.

The user terminal 20 transmits request information 60, usage information 62, and setting information 64 to the management device 40. Further, the user terminal 20 receives recommendation information 66 output by the management device 40. The user terminal 20 notifies the user of the recommendation information 66 using the notification device 28. Details of the request information 60, the usage information 62, the setting information 64, and the recommendation information 66 will be described in [2] below.

The autonomous working machine 30 is a working machine capable of autonomously traveling and autonomously working. Examples of the autonomous working machine 30 include various working machines that perform predetermined work in a region that is determined in advance, such as a lawn mower, a grass mower, a snowplow, a vacuum cleaner, an agricultural machine, and a construction machine. The autonomous working machine 30 in the following description is a lawn mower.

The autonomous working machine 30 includes a positioning device (not shown), a traveling device (not shown), and a working device (not shown). The positioning device includes various devices for measuring the position of the autonomous working machine 30, such as a GNSS receiver and an acceleration sensor. The traveling device includes various devices used for the autonomous working machine 30 to travel, such as a traction motor, a motor driving mechanism, and wheels. The rotary shaft of the traction motor and the wheels are coupled via the motor driving mechanism. The working device includes various devices used for the autonomous working machine 30 to perform work (lawn mowing), such as a work motor, a motor driving mechanism, and a blade. The rotary shaft of the work motor and the blade are coupled via the motor driving mechanism.

The autonomous working machine 30 also includes a processing device 32, a storage device 34, and a communication device 36. The processing device 32 includes processing circuitry. The processing circuitry may be a processor such as a CPU or a GPU. The storage device 34 includes a memory. The communication device 36 includes a communication module capable of communicating with the management device 40 via the communication network 80.

In the present specification, the autonomous working machine 30 that has already been used by the user is also referred to as a used working machine 30*a*. The used working machine 30*a* transmits history information 68 to the management device 40. Further, the used working machine 30*a* receives the setting information 64 output by the management device 40. The used working machine 30*a* stores the setting information 64 in the storage device 34, and performs work based on the setting information 64. Details of the setting information 64 and the history information 68 will be described in [2] below.

The management device 40 is a computer such as a server. The management device 40 outputs an operation instruction to each used working machine 30*a*, and collects and manages various kinds of information from the used working machines 30*a*. In addition, the management device 40 outputs various kinds of information about the autonomous working machine 30 to the user terminal 20. That is, the management device 40 corresponds to an information output device. The management device 40 includes a processing device 42, a storage device 44, and a communication device 46.

The processing device 42 includes processing circuitry. The processing circuitry may be a processor such as a CPU or a GPU. The processing circuitry may be an integrated circuit such as an ASIC or an FPGA. The processor can execute various processes by executing programs stored in a nonvolatile memory. For example, the processor functions as a first acquisition unit 52, a second acquisition unit 54, a change unit 56, an output unit 58, and the like.

The first acquisition unit 52 acquires the request information 60, the usage information 62, and the setting information 64 output by the user terminal 20. Further, the first acquisition unit 52 acquires the history information 68 output by the used working machine 30*a*. The second acquisition unit 54 acquires working machine information 70 stored in the storage device 44. The change unit 56 changes the setting information 64. The output unit 58 outputs (transmits) various kinds of information to the user terminal 20 or the used working machine 30*a*.

The storage device 44 includes various memories (a volatile memory, a nonvolatile memory, and the like). Examples of the volatile memory include a RAM and the like. The volatile memory is used as a working memory of the processor. The volatile memory temporarily stores data and the like necessary for processing or calculation. Examples of the nonvolatile memory include a ROM, a flash memory, and the like. The nonvolatile memory is used as a memory for storage. The nonvolatile memory stores programs, tables, maps, and the like.

The nonvolatile memory stores the working machine information 70. Details of the working machine information 70 will be described in [2] below. The nonvolatile memory stores, for example, a program for executing an information outputting process described in [3] below. The program includes a first algorithm for calculating the recommendation information 66 based on the request information 60 and the working machine information 70. Further, the program includes a second algorithm for calculating the recommendation information 66 based on the request information 60, the usage information 62, the working machine information 70, and the history information 68. Further, the nonvolatile memory stores an identification number of the user and an identification number of the used working machine 30*a* in association with each other. The identification number of the user is, for example, a SIM card number, a serial number of the user terminal 20, or the like.

The communication device 46 includes a communication module capable of communicating with the user terminal 20 and the autonomous working machine 30 via the communication network 80.

The management device 40 transmits the recommendation information 66 to the user terminal 20. Moreover, the management device 40 receives the request information 60, the usage information 62, and the setting information 64 output by the user terminal 20. Further, the management device 40 transmits the setting information 64 to the used working machine 30*a*. Furthermore, the management device 40 receives the history information 68 output by the used working machine 30*a*.

2. Various Information

Information transmitted and received between the devices, and stored information are as follows.

[2-1. Request Information 60]

The user can input the request information 60 to the user terminal 20 by operating the input device 22 of the user terminal 20. The request information 60 is transmitted from the user terminal 20 to the management device 40. The request information 60 includes various kinds of information related to the request of the user.

The request information 60 includes, for example, information such as a working time, a working time slot, a work region, and a cost. The information about the working time indicates a total time during which the autonomous working machine 30 works in one day. The information about the working time slot indicates a time slot in which the autonomous working machine 30 works. The information about the work region indicates the area and the shape of a region in which the autonomous working machine 30 works. The information about the cost indicates a cost for using the autonomous working machine 30, and indicates the maximum amount of money requested by the user. For example, the cost includes a cost required for purchase, rental, or lease of the autonomous working machine 30, a cost required for installation of equipment related to the autonomous working machine 30, and the like.

Note that the request information 60 may include other requests. For example, the request information 60 may include information such as the quality of work (the quality of lawn mowing) performed by the autonomous working machine 30, the quietness of the autonomous working machine 30, and the presence or absence of an anti-theft function.

[2-2. Usage Information 62]

The user who is already using the used working machine 30*a* can input the usage information 62 to the user terminal 20 by operating the input device 22 of the user terminal 20. The usage information 62 is transmitted from the user terminal 20 to the management device 40. The usage information 62 includes various kinds of information related to the usage status of the used working machine 30*a*.

The usage information 62 includes, for example, information such as a model and the number of working machines. The information about the model indicates the model of the used working machine 30*a* used by the user. The information about the number of working machines indicates the number of the used working machines 30*a* used by the users.

[2-3. Recommendation Information 66]

The recommendation information 66 is transmitted from the management device 40 to the user terminal 20 and is notified by the notification device 28 of the user terminal 20. The recommendation information 66 is a response of the management device 40 to the request information 60, and includes various kinds of information recommended for the request of the user.

The recommendation information 66 includes, for example, information such as a model, the number of working machines, a working time, and a cost. The information about the model indicates a model of the autonomous working machine 30 recommended for the request of the user. The information about the number of working machines indicates the number of the autonomous working machines 30. The information about the working time indicates a total time during which one or more recommended autonomous working machines 30 work in one day. When the management device 40 changes the working time in the request information 60, the information about the working time in the recommendation information 66 indicates the working time that has been changed. The information about the cost indicates a cost for using one or more recommended autonomous working machines 30. When the management device 40 changes the cost in the request information 60, the information about the cost in the recommendation information 66 indicates the cost that has been changed.

[2-4. Setting Information 64]

The user who is already using the used working machine 30*a* can input the setting information 64 to the user terminal 20 by operating the input device 22 of the user terminal 20. The setting information 64 is transmitted from the user terminal 20 to the management device 40. Further, the setting information 64 is transmitted from the management device 40 to the used working machine 30*a* and stored in the storage device 34 of the used working machine 30*a*. The setting information 64 includes various kinds of information related to the operation set for the used working machine 30*a*.

The setting information 64 includes, for example, information such as a work timer, a work mode, and a work region. Further, the work mode includes information such as a traveling speed, a travel pattern, and a work speed. The information about the work timer indicates a total time during which the used working machine 30*a* works in one day. The information about the traveling speed indicates the speed at which the used working machine 30*a* travels during work, and indicates the rotational speed of the traction motor. The information about the travel pattern indicates a track on which the used working machine 30*a* travels during work. The track includes, for example, a random, zig-zag, spiral, or other pattern. The information about the work speed indicates the speed at which the used working machine 30*a* works, and indicates the rotational speed of the work motor. The information about the work region indicates a position of a region in which the used working machine 30*a* performs work.

[2-5. History Information 68]

Various sensors (not shown) of the used working machine 30*a* detect the history information 68. The history information 68 is stored in the storage device 34. The history information 68 includes various kinds of information related to a work history, a maintenance history, and the like of the used working machine 30*a*.

The history information 68 includes, for example, information such as a working time, a load, and a maintenance status. The information about the working time indicates a total time during which the used working machine 30*a* has performed work. The information about the load indicates an average load of the work motor. The information about the maintenance status indicates a record of maintenance performed on the used working machine 30*a*.

[2-6. Working Machine Information 70]

The working machine information 70 is stored in advance in the storage device 44 of the management device 40. The working machine information 70 includes various kinds of information related to the performance of the autonomous working machine 30. The working machine information 70 is set for each model of the autonomous working machine 30.

The working machine information 70 includes, for example, information such as a model, a work area, and a work width. The information about the work area and the information about the work width are each associated with the information about the model. The information about the model indicates a model of the autonomous working machine 30 usable in the working machine management system 10. The information about the work area indicates an area over which the autonomous working machine 30 can cut grass per unit time. The information about the work width indicates a width at which the autonomous working machine 30 can cut grass when traveling straight.

3. Information Outputting Process

The processing device 42 of the management device 40 can perform information outputting processes according to the first embodiment and the second embodiment described below.

[3-1. First Embodiment]

FIG. 2 is a flowchart of an information outputting process according to a first embodiment. The information outputting process is started when the request information 60 is transmitted from the user terminal 20 to the management device 40. An operator of the user terminal 20 is a user who newly desires to acquire the autonomous working machine 30. This information outputting process is executed when the user checks the model and the number of the autonomous working machines 30 suitable for the work (lawn mowing). According to the first embodiment, the model and the number of the autonomous working machines 30 satisfying the request of the user are displayed on the user terminal 20. Alternatively, by changing the working time or the cost in the request of the user, the model and the number of the autonomous working machines 30 satisfying the request of the user are displayed on the user terminal 20.

In step S1, the first acquisition unit 52 acquires the request information 60 via the communication device 46. The first acquisition unit 52 stores the request information 60 in the volatile memory. When step S1 is completed, the process proceeds to step S2.

In step S2, the second acquisition unit 54 acquires the working machine information 70 of each model from the nonvolatile memory of the storage device 44, and stores the working machine information 70 in the volatile memory. When step S2 is completed, the process proceeds to step S3.

In step S3, the output unit 58 generates the recommendation information 66 that satisfies the request of the user, based on the request information 60 and the working machine information 70. Here, the output unit 58 generates the recommendation information 66 by using the first algorithm stored in the nonvolatile memory of the storage device 44. The output unit 58 specifies the model and the number of the autonomous working machines 30 that can complete the work (lawn mowing) in the work region included in the request information 60 within the working time included in the request information 60 and within the cost included in the request information 60. When the number of the autonomous working machines 30 is plural, the models of the autonomous working machines 30 may be the same or different.

In step S4, the output unit 58 determines whether the recommendation information 66 satisfying the request of the user was able to be generated. Here, the output unit 58 determines whether the recommendation information 66 was able to be generated without changing the working time and the cost in the request information 60. When the output unit 58 was able to generate the recommendation information 66 that satisfies the request of the user (step S4: YES), the process proceeds to step S7. On the other hand, when the output unit 58 was not able to generate the recommendation information 66 that satisfies the request of the user (step S4: NO), the process proceeds to each of step S5 and step S6.

When the process proceeds from step S4 to step S5, the output unit 58 increases the working time included in the request information 60. For example, the output unit 58 adds a predetermined time to the working time to generate new request information 60. In the new request information 60, each information other than the working time is not changed. When step S5 is completed, the process returns to step S3.

When the process proceeds from step S4 to step S6, the output unit 58 increases the cost included in the request information 60. For example, the output unit 58 adds a predetermined amount of money to the cost to generate new request information 60. In the new request information 60, each information other than the cost is not changed. When step S6 is completed, the process returns to step S3.

When the process returns from step S5 and step S6 to step S3, the output unit 58 generates the recommendation information 66 that satisfies the request of the user, based on the new request information 60, and the working machine information 70. The output unit 58 repeatedly performs the process of step S5 until the recommendation information 66 satisfying the request information 60 in which the working time is increased is generated. In addition, the output unit 58 repeatedly performs the process of step S6 until the recommendation information 66 satisfying the request information 60 in which the cost is increased is generated. In the case where the output unit 58 can generate two pieces of recommendation information 66 satisfying the request of the user (the recommendation information 66 in which only the working time is increased and the recommendation information 66 in which only the cost is increased) (step S4: YES), the process proceeds to step S7.

When the process proceeds from step S4 to step S7, the output unit 58 determines whether there is a change in the request information 60. When there is a change in the request information 60, that is, when the process of step S5 and the process of step S6 have been performed (step S7: YES), the process proceeds to step S8. On the other hand, when there is no change in the request information 60, that is, when the process of step S5 and the process of step S6 have not been performed (step S7: NO), the process proceeds to step S9.

When the process proceeds from step S7 to step S8, the output unit 58 outputs (transmits) each of the recommendation information 66 in which the working time is prioritized and the recommendation information 66 in which the cost is prioritized. The recommendation information 66 in which the working time is prioritized is the recommendation information 66 generated based on the request information 60 in which the working time is not changed. That is, this recommendation information 66 is the recommendation information 66 generated in step S3 via step S6. This recommendation information 66 includes information such as the model of the autonomous working machine 30, the number of the autonomous working machines 30, the initial working time, and the cost that has been increased. On the other hand, the recommendation information 66 in which the cost is prioritized is the recommendation information 66 generated based on the request information 60 in which the cost is not changed. That is, the recommendation information 66 is the recommendation information 66 generated in step S3 via step S5. This recommendation information 66 includes information such as the model of the autonomous working machine 30, the number of the autonomous working machines 30, the working time that has been increased, and the initial cost. The output unit 58 outputs each piece of the recommendation information 66 to the user terminal 20 via the communication device 46.

When step S8 is performed, a message indicating that there is no recommendation information 66 satisfying the request of the user is displayed on the display (notification device 28) of the user terminal 20. Further, two patterns of the recommendation information 66 close to the request of the user are displayed on the display of the user terminal 20. That is, on the display of the user terminal 20, the recommendation information 66 in which the working time is prioritized and the recommendation information 66 in which the cost is prioritized are displayed.

When the process proceeds from step S7 to step S9, the output unit 58 outputs (transmits) the recommendation information 66 responding to the request of the user. This recommendation information 66 is the recommendation information 66 generated based on the request information 60 acquired in step S1. That is, this recommendation information 66 is the recommendation information 66 generated without going through step S5 and step S6. This recommendation information 66 includes information such as the model of the autonomous working machine 30, the number of the autonomous working machines 30, the initial working time, and the initial cost. The output unit 58 outputs the recommendation information 66 to the user terminal 20 via the communication device 46.

When step S9 is performed, the recommendation information 66 satisfying the request of the user is displayed on the display (notification device 28) of the user terminal 20.

[3-2. Second Embodiment]

Figure 4:
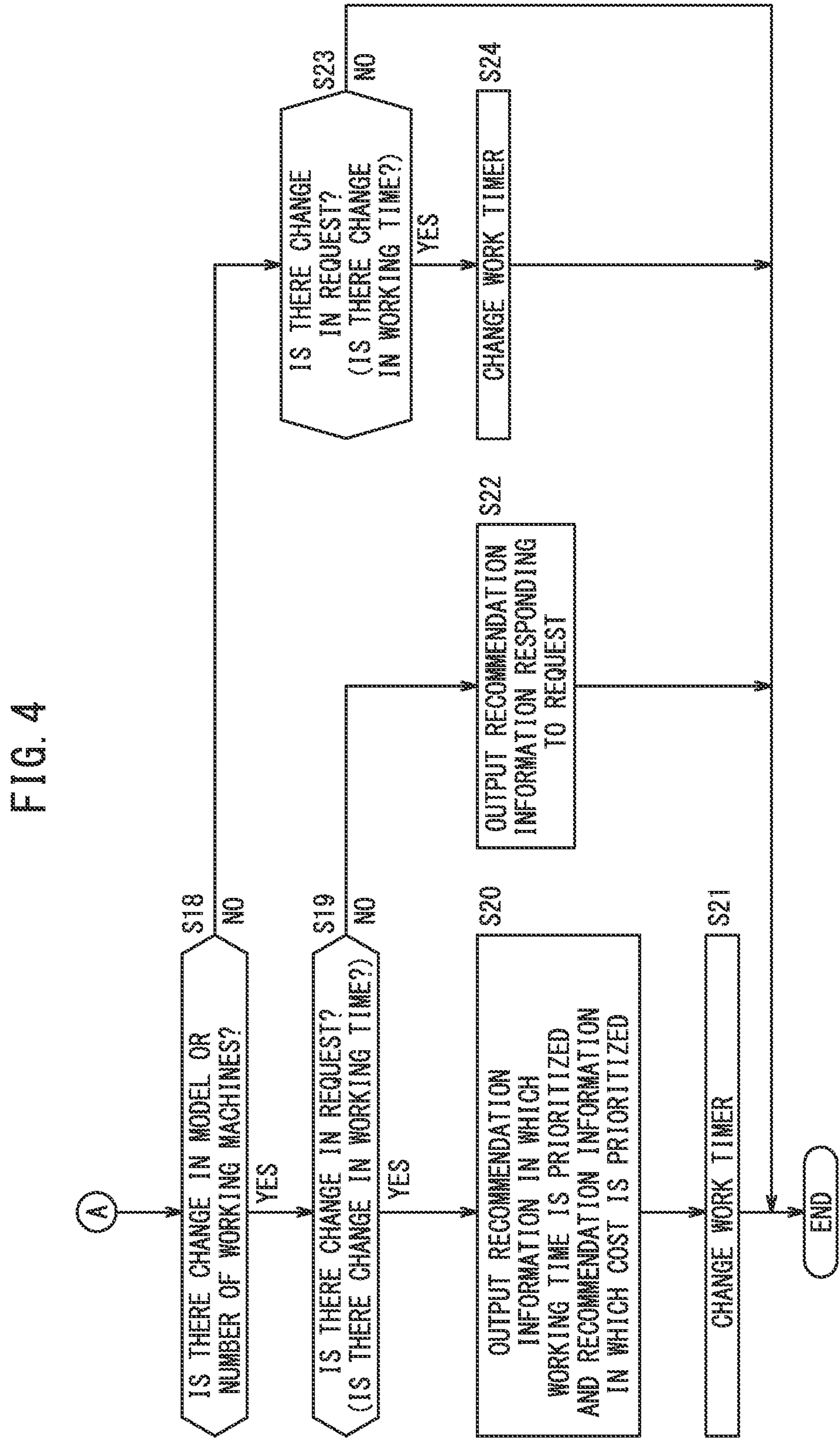
FIG. 4 is a flowchart of the information outputting process according to the second embodiment.

FIGS. 3 and 4 are flowcharts of an information outputting process according to the second embodiment. The information outputting process is started when the request information 60 and the usage information 62 are transmitted from the user terminal 20 to the management device 40. An operator of the user terminal 20 is a user who is already using one or more autonomous working machines 30. This information outputting process is executed when the user checks whether addition (or reduction) of the autonomous working machine 30 is necessary when performing work (lawn mowing) in the work region.

In step S11, the first acquisition unit 52 acquires the request information 60 and the usage information 62 via the communication device 46. The first acquisition unit 52 stores the request information 60 and the usage information 62 in the volatile memory. When step S11 is completed, the process proceeds to step S12.

In step S12, the first acquisition unit 52 acquires the history information 68 via the communication device 46. The first acquisition unit 52 stores the history information 68 in the volatile memory. The history information 68 may be periodically transmitted from the used working machine 30*a* to the management device 40. When step S12 is completed, the process proceeds to step S13.

In step S13, the second acquisition unit 54 acquires the working machine information 70 of each model from the nonvolatile memory of the storage device 44, and stores the working machine information 70 in the volatile memory. When step S13 is completed, the process proceeds to step S14.

In step S14, the output unit 58 generates the recommendation information 66 that satisfies the request of the user, based on the request information 60, the usage information 62, the working machine information 70, and the history information 68. Here, the output unit 58 generates the recommendation information 66 by using the second algorithm stored in the nonvolatile memory of the storage device 44. The process of step S14 is the same as the process of step S3 shown in FIG. 2, except that the second algorithm is used. When step S14 is completed, the process proceeds to step S15.

In step S15, the output unit 58 determines whether the recommendation information 66 satisfying the request of the user was able to be generated. When the output unit 58 was able to generate the recommendation information 66 satisfying the request of the user (step S15: YES), the process proceeds to step S18. On the other hand, when the output unit 58 was not able to generate the recommendation information 66 satisfying the request of the user (step S15: NO), the process proceeds to each of step S16 and step S17.

The process of step S16 is the same as the process of step S5 shown in FIG. 2. Further, the process of step S17 is the same as the process of step S6 shown in FIG. 2.

When the process proceeds from step S15 to step S18, the output unit 58 compares the model and the number of the autonomous working machines 30 specified in step S14 with the model and the number of the used working machines 30*a* included in the usage information 62. When the specified model is different from the model included in the usage information 62, the model is changed. Further, when the specified number of working machines is different from the number of working machines included in the usage information 62, the number of working machines is changed. When there is a change in the model or the number of working machines (step S18: YES), the process proceeds to step S19. On the other hand, when there is no change in the model and the number of working machines (step S18: NO), the process proceeds to step S23.

When the process proceeds from step S18 to step S19, the output unit 58 determines whether there is a change in the request information 60 (working time). When there is a change in the request information 60 (working time), that is, when the process of step S16 (and the process of step S17) have been performed (step S19: YES), the process proceeds to step S20. On the other hand, when there is no change in the request information 60 (working time), that is, when the process of step S16 (and the process of step S17) have not been performed (step S19: NO), the process proceeds to step S22.

When the process proceeds from step S19 to step S20, the output unit 58 outputs each of the recommendation information 66 in which the working time is prioritized and the recommendation information 66 in which the cost is prioritized. The process of step S20 is substantially the same as the process of step S8 shown in FIG. 2. However, the information about the model and the number of the autonomous working machines 30 included in the recommendation information 66 is information obtained by changing the model and the number of the working machine included in the usage information 62. That is, the recommendation information 66 includes model change information and number-of machines change (increase or decrease) information. The model change information includes information for changing a part or all of the used working machines 30*a* used by the user, information for newly adding the autonomous working machine 30 to the used working machine 30*a* used by the user, information for deleting a part of the used working machines 30*a* used by the user, and the like. When step S20 is completed, the process proceeds to step S21.

In step S21, the change unit 56 changes the work timer of the used working machine 30*a*. The change unit 56 changes information of the work timer included in the setting information 64 to the working time that has been increased in step S16. The output unit 58 transmits the setting information 64 to the used working machine 30*a*. As a result, a new work timer is set for the used working machine 30*a*. When step S21 is completed, the information outputting process ends.

When the process proceeds from step S19 to step S22, the output unit 58 outputs the recommendation information 66 responding to the request of the user. The process of step S22 is substantially the same as the process of step S9 shown in FIG. 2. However, the information about the model and the number of the autonomous working machines 30 included in the recommendation information 66 is information obtained by changing the model and the number of the working machine included in the usage information 62. That is, the recommendation information 66 includes model change information and number-of machines change (increase or decrease) information. When step S22 is completed, the information outputting process ends.

When the process proceeds from step S18 to step S23, the output unit 58 determines whether there is a change in the request information 60 (working time). When there is a change in the request information 60, that is, when the process of step S16 (and the process of step S17) have been performed (step S23: YES), the process proceeds to step S24. On the other hand, when there is no change in the request information 60, that is, when the process of step S16 (and the process of step S17) have not been performed (step S23: NO), the information outputting process ends. That is, in a case where there is no change in the model and the number of working machines and there is no change in the request, one or more used working machines 30*a* used by the user at the current time satisfy the request of the user.

When the process proceeds from step S23 to step S24, the same process as step S21 is performed. When step S24 is completed, the information outputting process ends.

4. Invention Obtained from the Embodiment

The invention that can be grasped from the above embodiment will be described below.

The first aspect of the present invention is the information output device (40) that outputs the recommendation information (66) related to the autonomous working machine (30) configured to autonomously travel and autonomously work, the information output device including: the first acquisition unit (52) configured to acquire the request information (60) that is a request of the user; the second acquisition unit (54) configured to acquire the working machine information (70) that is related to the performance of the autonomous working machine and is set for each type of the autonomous working machine; the output unit (58) configured to output the recommendation information satisfying the request of the user, based on the request information and each piece of the working machine information, wherein the request information includes information about the working time during which the autonomous working machine works, information about the work region in which the autonomous working machine works, and information about the cost for using the autonomous working machine, and the recommendation information includes information about the model of the autonomous working machine to be recommended to the user for acquisition.

According to the above configuration, it is possible to recommend a model of the autonomous working machine suitable for the working time and the cost of the user.

In the first aspect, the output unit may output, as the recommendation information, information about the model of the autonomous working machine and information about the number of the autonomous working machines.

According to the above configuration, even when the request of the user cannot be satisfied by one autonomous working machine, the request of the user can be satisfied by a combination of a plurality of the autonomous working machines.

In the first aspect, when the recommendation information satisfying the request of the user does not exist, the output unit may output the recommendation information obtained by increasing the working time and the recommendation information obtained by increasing the cost.

According to the above configuration, there is a possibility that a proposal acceptable by the user can be made even when the request of the user is difficult to satisfy. Further, according to the above configuration, it is possible to cause the user to select the recommendation information close to the request of the user.

In the first aspect, the second acquisition unit may further acquire the history information (68) recorded in the used working machine (30*a*) that is the autonomous working machine already used by the user, and the output unit may output the recommendation information satisfying the request of the user, based on the request information, each piece of the working machine information, and the history information.

In the first aspect, the information output device may further include the change unit (56) configured to change the set time of the work timer configured to set a time during which the used working machine is caused to work, and when there is a change in the working time, the change unit may change the set time of the work timer to the working time that has been changed.

According to the above configuration, the changed working time can be reflected in the autonomous working machine.

In the first aspect, the request information may further include the information related to the function of the autonomous working machine.

According to the above configuration, the user can select the quality of work (the quality of lawn mowing), the quietness, the presence or absence of an anti-theft function, and the like.

In the first aspect, the autonomous working machine may be a lawn mower.

In the first aspect, the output unit may output the recommendation information to the terminal device (20) of the user.

The second aspect of the present invention is the information output method for outputting the recommendation information related to the autonomous working machine, wherein the computer (40) executes: the step (step S1, step S11) of acquiring the request information that is a request of the user; the step (step S2, step S13) of acquiring the working machine information that is related to the performance of the autonomous working machine and is set for each type of the autonomous working machine; the step (step S3 to step S9, step S14 to step S20, step S22) of outputting the recommendation information satisfying the request of the user, based on the request information and each piece of the working machine information, and wherein the request information includes information about the working time during which the autonomous working machine works, information about the work region in which the autonomous working machine works, and information about the cost for introducing the autonomous working machine, and the recommendation information includes information about the model of the autonomous working machine to be recommended to the user for acquisition.

According to the above configuration, the same effect as that of the first aspect can be obtained.

The present invention is not limited to the above disclosure, and various modifications are possible without departing from the essence and gist of the present invention.

The invention claimed is:

1. An information output device that outputs recommendation information related to an autonomous working machine configured to autonomously travel and autonomously work, the information output device comprising:

one or more processors that execute computer-executable instructions stored in a memory, wherein the one or more processors execute the computer-executable instructions to cause the information output device to:

acquire, as request information that is a request of a user, information about a working time in which the autonomous working machine works, information about a work region in which the autonomous working machine works, and information about a cost for using the autonomous working machine;

acquire working machine information that is related to performance of the autonomous working machine and is set for each model of the autonomous working machine;

acquire, as use information relating to a used working machine, which is the autonomous working machine that is already being used by the user, information about a model of the used working machine and information about a number of the used working machines;

output, as the recommendation information satisfying the request of the user, information about a model of the autonomous working machine to be recommended to the user for acquisition, based on the request information, the use information and each piece of the working machine information;

when the recommendation information satisfying the request of the user does not exist, output first recommendation information obtained by increasing the working time and second recommendation information obtained by increasing the cost;

when the working time is increased to obtain the first recommendation information, change a time period set to a work timer to a working time included in the first recommendation information, the used working machine being caused to perform work for the time period; and transmit setting information including changed work timer information to the used working machine to cause the used working machine to perform work in the work region for the working time based on the setting information.

2. The information output device according to claim 1, wherein the one or more processors execute the computer-executable instructions to cause the information output device to output, as the recommendation information, information about the model of the autonomous working machine and information about a number of the autonomous working machines.

3. The information output device according to claim 1, wherein the one or more processors execute the computer-executable instructions to cause the information output device to:

acquire history information recorded in a used working machine that is the autonomous working machine already used by the user, and output the recommendation information satisfying the request of the user, based on the request information, each piece of the working machine information, and the history information.

4. The information output device according to claim 1, wherein the request information further includes information related to a function of the autonomous working machine.

5. The information output device according to claim 1, wherein the autonomous working machine is a lawn mower.

6. The information output device according to claim 1, wherein the one or more processors cause the information output device to:

output the recommendation information to a terminal device of the user.

7. An information output method for outputting recommendation information related to an autonomous working machine, wherein a computer executes:

acquiring, as request information that is a request of a user, information about a working time in which the autonomous working machine works, information about a work region in which the autonomous working machine works, and information about a cost for using the autonomous working machine;

acquiring working machine information that is related to performance of the autonomous working machine and is set for each type of the autonomous working machine;

acquiring, as use information relating to a used working machine, which is the autonomous working machine that is already being used by the user, information about a model of the used working machine and information about a number of the used working machines;

outputting, as the recommendation information satisfying the request of the user, information about a model of the autonomous working machine to be recommended to the user for acquisition, based on the request information, the use information and each piece of the working machine information;

when the recommendation information satisfying the request of the user does not exist, outputting first recommendation information obtained by increasing the working time and second recommendation information obtained by increasing the cost; and when the working time is increased to obtain the first recommendation information, changing a time period set to a work timer to a working time included in the first recommendation information, the used working machine being caused to perform work for the time period; and transmitting setting information including changed work timer information to the used working machine to cause the used working machine to perform work in the work region for the working time based on the setting information.

* * * * *